July 21, 1959   K. B. SORENSEN ET AL   2,895,280
BEET HARVESTER

Filed March 12, 1956   4 Sheets-Sheet 2

INVENTORS.
KNUD B. SORENSEN
HAROLD R. LINDSTROM
BY
ATTORNEYS

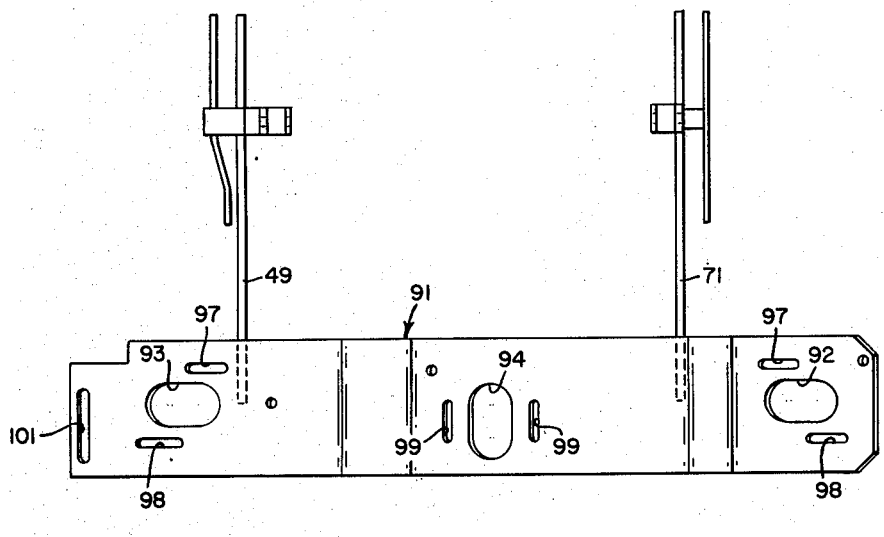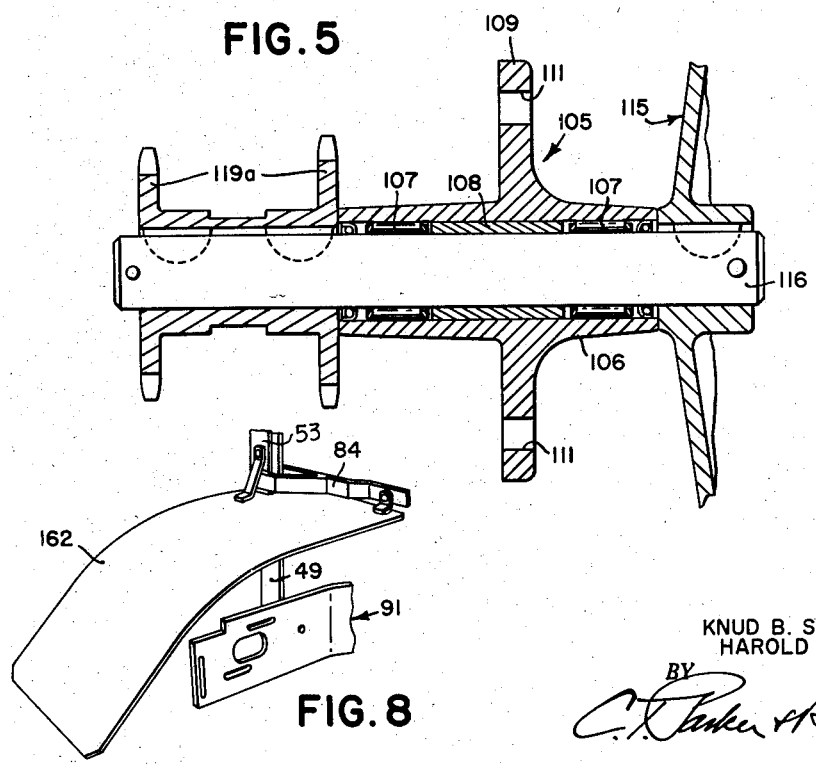

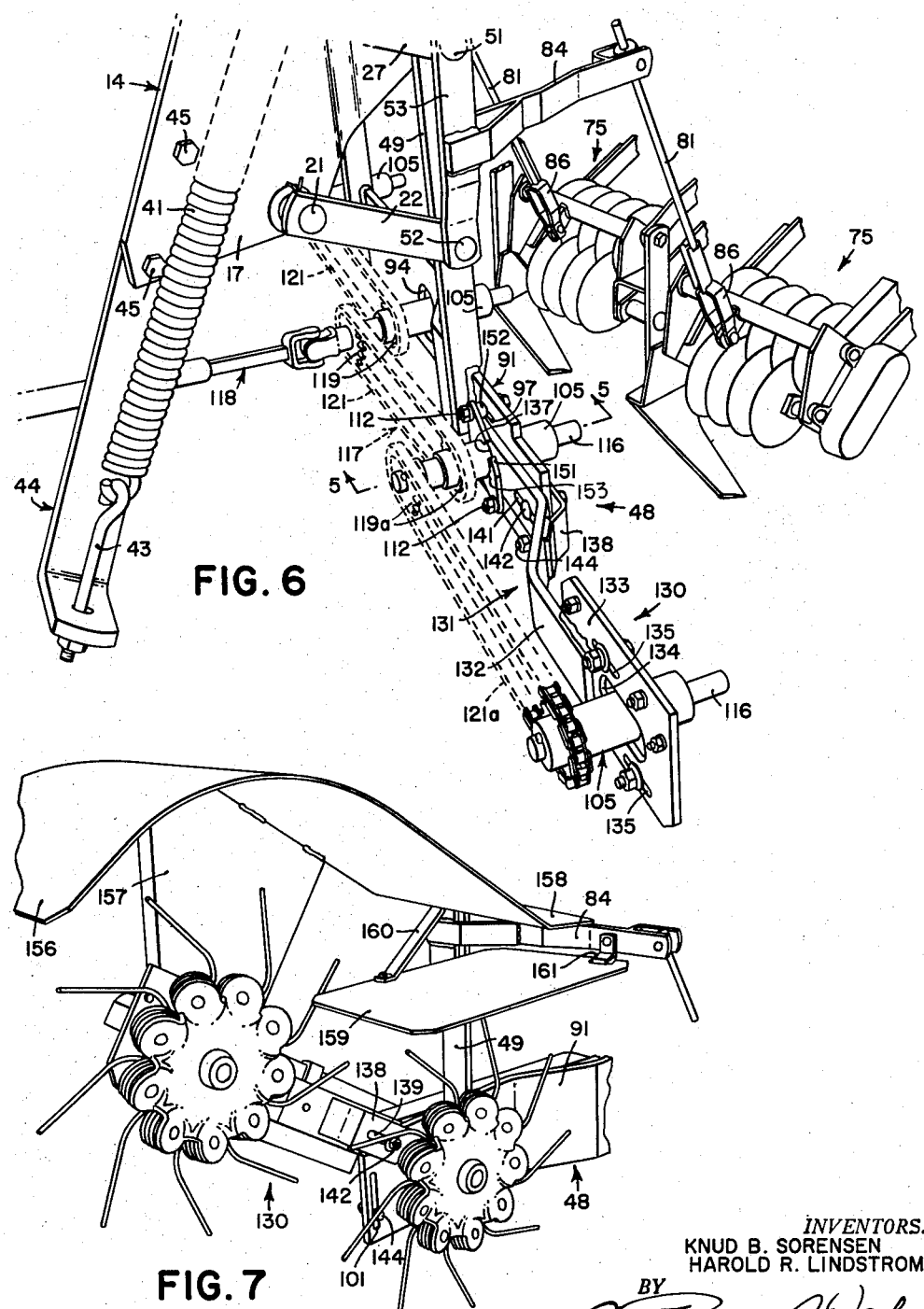

United States Patent Office 2,895,280
Patented July 21, 1959

2,895,280

BEET HARVESTER

Knud B. Sorensen and Harold R. Lindstrom, Rock Island, Ill., assignors, by mesne assignments, to Deere & Company, a corporation of Delaware Application March 12, 1956, Serial No. 570,937

9 Claims. (Cl. 56—121.44)

The present invention relates generally to agricultural implements and more particularly to harvesters for root crops, such as sugar beets and the like.

The object and general nature of the present invention is the provision of new and improved means for handling the tops, which are usually severed from the beets before the latter are taken from the ground, and a more specific feature of the present invention is the provision of a windrowing attachment for the top disposal unit which is adapted to pick up all beet tops from the main top disposal unit and move them out of the line of travel of the rear wheel of the tractor on which the harvester is mounted. In thus preventing the tractor wheel from running over the beet tops, the latter are made available for subsequent use. For example, many farmers want to save the beet tops for feed, in which case it is extremely undesirable to have dirt and the like mixed in with the tops. According to the principles of the present invention, the top disposal means may readily be adjusted to engage all of the tops but to clear the ground so that no dust, dirt or the like is mixed in with the tops.

Another important feature of the present invention is the provision of a windrowing attachment which may easily and conveniently be swung down into operating position, or raised up into an inoperative position, as for initially opening up a field in which case it is desirable to work as close to the fence, border or the like as possible.

These and other objects and advantages of the present invention will be apparent to those skilled in the art after a consideration of the following detailed description, taken in conjunction with the accompanying drawings in which the preferred structure has been shown by way of illustration.

Fig. 4 is a fragmentary elevation view, corresponding to a view taken along the line 4—4 of Fig. 3, showing in particular the vertical and horizontal adjustments provided for the rake wheels.

Fig. 5 is an enlarged sectional view taken generally along the line 5—5 of Fig. 6.

Fig. 6 is a fragmentary perspective view showing in particular the drive mechanism for the rake wheels and the connections between the top disposal unit and the adjacent portions of the finder wheel units.

Fig. 7 is a fragmentary perspective view somewhat similar to Fig. 1, showing the windrow rake wheel unit in a raised or inoperative position.

Fig. 8 is a fragmentary perspective view somewhat similar to Fig. 1, showing the shield that is employed with the main rake wheel unit when the windrow rake wheel attachment unit is omitted.

Figure 1:
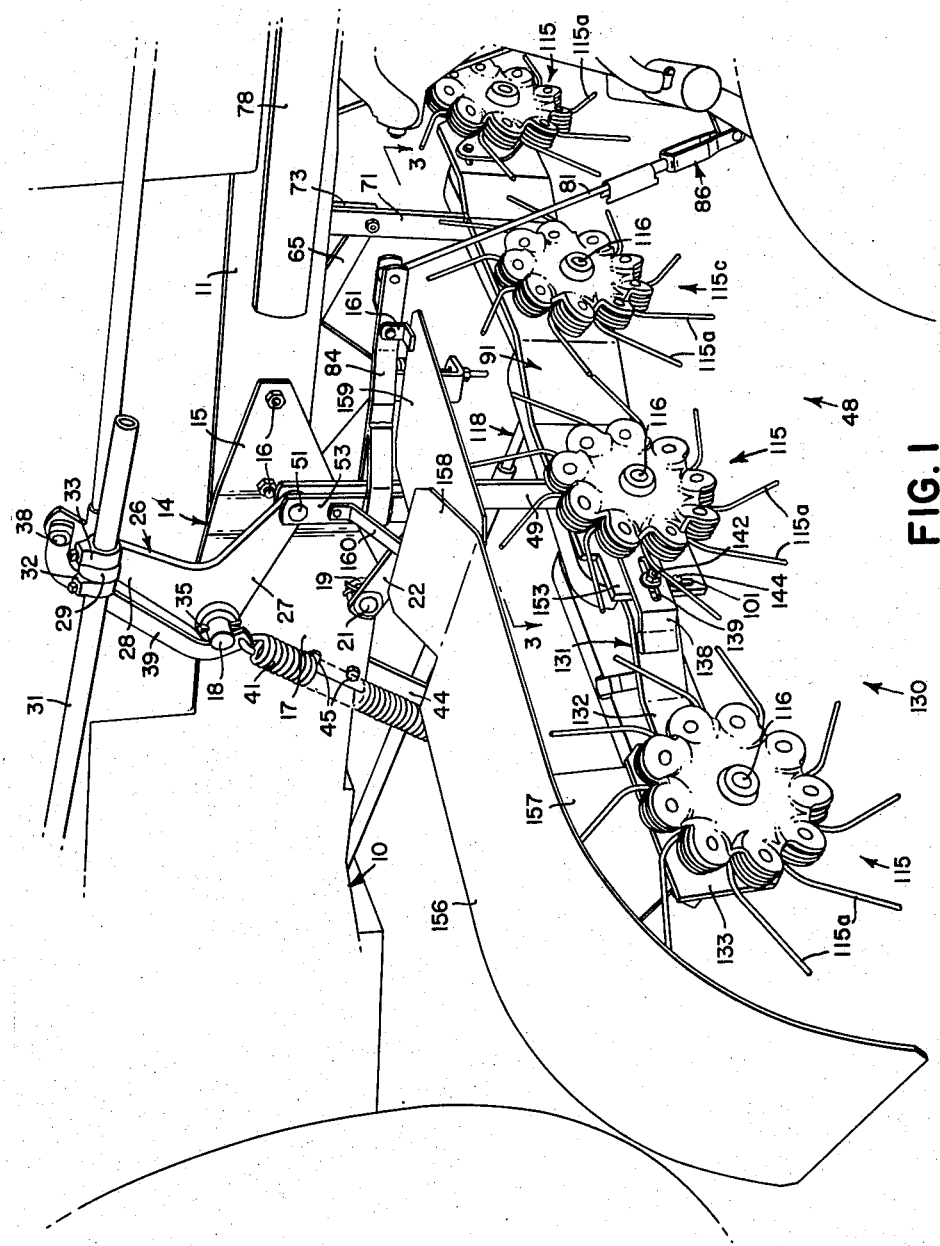
Fig. 1 is a fragmentary perspective view of a beet harvester in which the principles of the present invention have been incorporated, the top disposal being shown as incorporating a windrow attachment illustrated in its working or operative position, the view being taken from the right side of the tractor on which the harvester is mounted.

Referring first to Fig. 1, the tractor is indicated fragmentarily at 10 and includes a frame that has right and left hand sills 11 and 12, these members being generally in the form of heavy plates or angles and extend in a generally fore-and-aft direction. Mounted on the right hand sill member 11 is a right hand bracket or pivot plate 14 having a front section 15 apertured to receive a pair of bolts 16 by which the bracket may be rigidly fixed to the frame member 11. The member 14 includes a rear laterally outwardly offset section 17 that is provided at its upper portion with a laterally outwardly extending stud 18 rigidly fixed to the member 14. Directly underneath the stud 18, the member 14 is apertured, as at 19, to receive a rockshaft 21 that extends substantially directly transversely of the tractor. A lower link 22 is fixed, as by welding, to the right end of the rockshaft 21. Mounted on the stud 18 is a bell crank 26, the lower leg 27 of which serves as a link extending generally parallel to the link 22. The bell crank 26 also includes an upwardly extending leg 28 that is apertured at its upper end to receive a swivel member 29 through which a lift pipe 31 is extended. Adjustable set screw collars 32 and 33 are fixed to the lift pipe 31, whereby fore-and-aft movement of the pipe 31 is communicated to the bell crank 26. The bell crank 26 is held in place on the stud by a cotter 35 or other suitable fastener. The bell crank leg section 28 is extended upwardly beyond the aperture receiving the swivel eye 29 and receives a pivot member 38 by which a generally U-shaped link 39 is connected to the upper end portion of the bell crank 26. The link 39 is extended generally downwardly beyond the pivot stud 18 and receives the upper end of a spring 41, the lower end of which is adjustably connected, as by an eye bolt 43 (Fig. 6), to the lower outturned apertured end of a bracket 44 that is fixed, as by bolts 45, to the lower rear portion of the pivot plate or bracket 14. As shown in Fig. 1, the spring means 41 is disposed in substantially a straight-line relation with respect to the pivots 18 and 38, whereby the spring, although under tension, does not exert any appreciable lifting effort on the rake wheel unit 48, the right portion of which is supported on the links 22 and 27 by virtue of a vertical bar 49 that at its upper end is pivotally connected to the forward end of the upper link 27 and, at a point below the link 27, to the forward end of the lower link 22. The pivots between the upper portion of the bar 49 and the links 27 and 22 are indicated at 51 and 52, respectively, Figs. 1 and 6, the upper portion of the bar 49 including an auxiliary strap section 53, whereby the upper portion of the bar 49, in effect, includes laterally spaced apart portions interconnected with the upper and lower links 22 and 27 at opposite sides of the latter.

The left portion of the rake wheel unit 48 is supported from the tractor 10 by lower and upper parallel links, similar to the parts 22 and 27 described above, and the supporting means for the left end of the rake wheel unit 48 will now be described.

Figure 2:
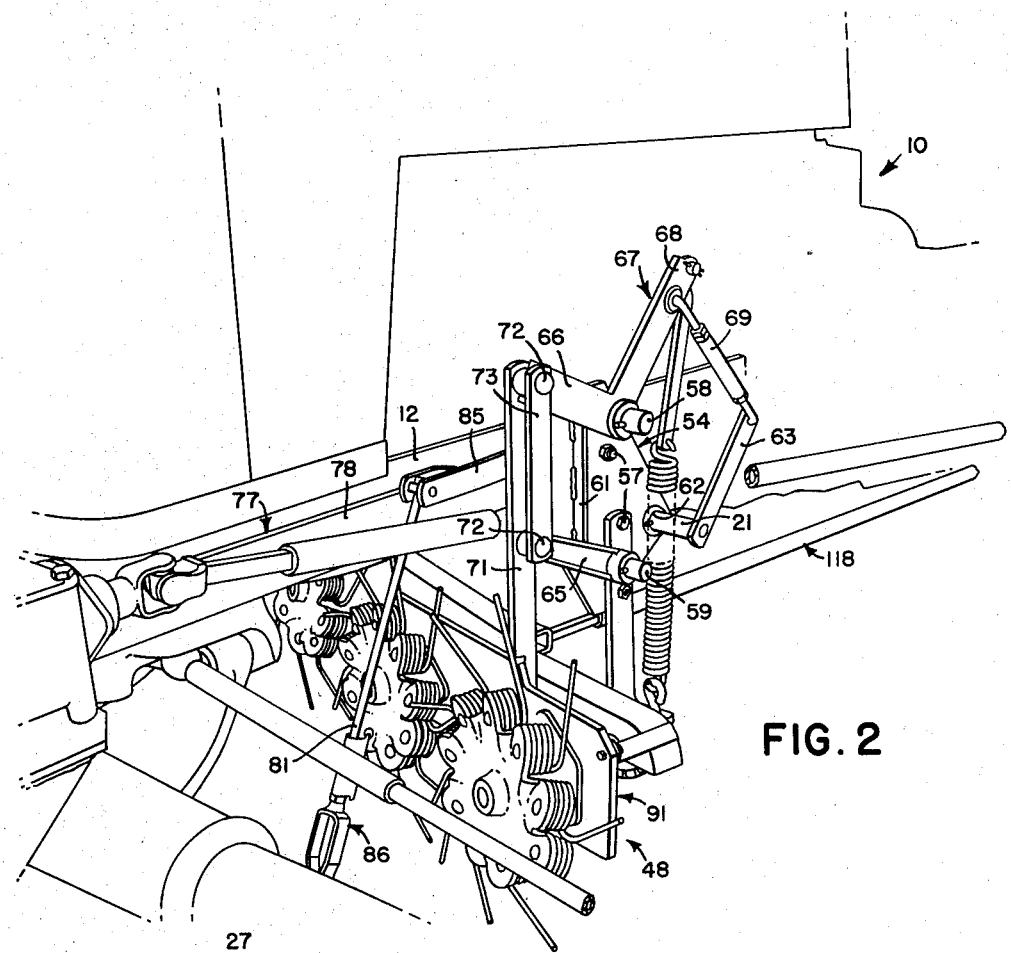
Fig. 2 is a fragmentary perspective view, taken from the left side of the tractor, showing the parallel link arrangement for supporting the left end of the top disposal unit, and also the adjusting means whereby the parallel link means at the right side of the machine may be adjusted relative to the parallel link means at the left side.

Referring now to Fig. 2 a left hand bracket or pivot plate 54 is fixed to the left hand tractor frame member 12 by any suitable means, such as a pair of attaching bolts 57. Studs 58 and 59 are fixed at their inner ends to upper and lower portions of the plate member 54, and the studs 58 and 59 are re-enforced by a vertical rib or web 61 that forms a part of the plate 54, upper and lower ends of the rib 61 being fixed directly to the inner portions of the studs 58 and 59 at points that lie behind the arms 65 and 66 shown in Figure 2. The rear portion of the latter member is apertured, as at 62, to receive the left end of the rockshaft 21 to which an arm 63 is connected in any suitable way.

Mounted on the lower stud 59 is the lower link 65 of a pair of parallel links, the upper link of which is indicated at 66 and shown as a part of a bell crank 67 the other arm 68 of which extends upwardly and rearwardly, as shown in Fig. 2, and is connected with the arm 63 on the rockshaft 21 by adjustable turnbuckle means 69. The left portion of the rake wheel unit 48 is supported from the parallel links 65 and 66 by means of a vertical bar 71, the lower portion of which is connected with the unit 48 and the upper portion of which is apertured to receive pivots 72 by which the bar 71 is connected with the outer end of the links 65 and 66. The upper portion of the bar is re-enforced by an auxiliary strap 73.

The beet harvester of the present invention includes a pair of finder wheel units indicated fragmentarily at 75. The finder wheel units 75 are pivotally connected with the supporting frame means of the finder mechanism and other parts, which frame means is indicated fragmentarily at 77 (Fig. 1) and is represented by the frame bars 78 (Figs. 1 and 2) that are fixed to the tractor frame. Generally speaking, the latter serves as a frame or supporting means for the front portion of the topping unit. The finder units 75 are substantially like those shown in U.S. Patent 2,433,799, issued December 30, 1947 to C. W. Walz et al., and hence any further description is deemed unnecessary except to point out that in the present arrangement, the finder wheel units are connected to be raised and lowered with the rake wheel unit 48. To this end, a link 81 extends upwardly from each finder unit 75 and is adjustably connected at its upper end to an arm that is fixed to the rake wheel unit supporting means. Specifically, the right hand link 81 is connected to an arm 84 that is fixed to the vertical bar 49. The left hand link 81 is connected to an arm 85 that is fixed to the vertical bar 71. Each link may be individually adjusted by threaded yoke means 86.

Figure 3:
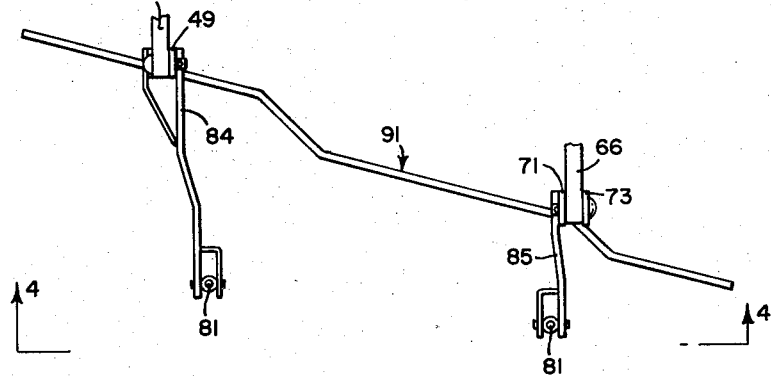
Fig. 3 is a fragmentary plan view of the top disposal frame and associated parts, corresponding generally to a view taken along the line 3—3 of Fig. 1 but showing in addition portions of the arms forming a part of the finder raising and lowering means.

Referring now more particularly to Figs. 3 and 4, the principal frame member of the rake wheel unit comprises main supporting means in the form of a generally transversely arranged plate member 91 the end portions of which are provided with horizontally extending slots 92 and 93 and the generally central portion of which is provided with a vertical slot 94, these slots forming apertures to receive rake wheel bearing units. Provided adjacent each of the slots 92–94 are bolt-receiving slots 97—98 and 99 arranged directionally in the same manner as the slots 92, 93 and 94. The vertical supporting bars 49 and 71 are at their lower ends secured by welding to the plate member 91. The right end of the latter member is also provided with a vertical slot 101 to which reference will be made below. As will be seen in Fig. 3, the frame or plate member 91 is disposed at a slight angle to an exactly transverse or perpendicular relation to the longitudinal axis of the harvester and, further, that the right and left hand end sections are offset relative to the central section, in which the vertical slot 94 is formed.

A rake wheel bearing unit, indicated in its entirety by the reference numeral 105 in Fig. 6, is disposed in each of the slots 92, 93 and 94. As best shown in Fig. 5, each rake wheel bearing unit includes a bearing sleeve section 106 carrying a pair of axially spaced apart bearing means 107 separated by a spacer 108 and a radially outwardly extending flanged portion 109 that is apertured, as at 111, to receive bolt means 112 disposable, respectively, in the slots 97, 98, 99, for the purpose of fixing the bearing units 105 in place. The end bearing units may be adjusted horizontally and the intermediate or middle bearing units may be adjusted vertically. By adjusting either or both of the end rake wheel units in the associated slots 92 and 93, the rake wheels may be positioned to accommodate any usual row spacing, this adjustment also being provided to form means whereby the driving chains, referred to later, may be tightened. The vertical adjustment of the center bearing unit makes it possible to dispose the center rake wheel in the proper ground level in relation to the two outside rake wheels. Final adjustment to the operating depth of the top disposal unit 48 as a whole may be made by shifting the lift pipe 31, which may be done either by a hand lever or by power, both means being conventional in this type of implement. The rake wheels are operated as high as possible while still moving all of the tops.

The three rake wheels carried by the plate member 91 are substantially identical and each is indicated by the reference numeral 115. Each rake wheel is fixed to the forward end of the rake wheel shaft 116 that is supported in the bearing means 107 and extends rearwardly therefrom so as to receive sprocket and chain means indicated generally at 117. The rake wheel shaft 116 for the center unit 115c is longer than the end units (except when the windrowing attachment is used, as will be described later), and the center shaft receives a power drive 118 by which power from any suitable source, such as a power take-off shaft on the tractor, may provide means for rotating all of the rake wheels. As will be seen from Fig. 6, the center rake wheel shaft carries two sprockets 119 and chains 121 lead from the sprockets 119 to sprockets on the end rake wheel shafts. The rake wheels 115 are per se of conventional construction so far as the present invention is concerned, forming the subject matter of a separate invention, already on file in the Patent Office. By virtue of the offset portions formed in the plate member 91, it will be seen that the fingers 115a of the rake wheels clear one another, yet the rake wheels 115 are sufficiently close together to handle all of the tops without leaving any on the ground.

The rake wheel units 48 and associated parts as so far described, including the three rake wheels 115, provide means for clearing the tops away from the topped beets so as to provide a clear path for the beet lifting mechanism (not shown) that immediately follows the topping operation of which the top disposal means described above is a part. In many cases, however, the farmer desires to save the tops and use them for feed, and therefore it is desirable to provide means for insuring that the tops will be moved not only away from the row of topped beets but also away from the path of travel of the adjacent rear wheels of the tractor, and to this end, according to the principles of the present invention, we provide a windrow attachment, indicated in its entirety by the reference numeral 130, that it is so constructed and arranged that, when in use, picks up all beet tops and moves them out of the line of travel of the adjacent rear tractor wheel, so that in subsequent operation, the tops, thus windrowed, may be picked up by other implements, such as a side delivery hay rake or the like, and brought to a place of storage. The windrow attachment 130 will now be described.

The windrow attachment 130 includes an auxiliary supporting means in the form of a plate or frame member 131 that is made up of a transverse plate section 132 to which a wider plate section 133 is attached, this part having a horizontal slot 134 and bolt receiving slots 135 arranged to receive one of the rake wheel bearing units 105. The inner end of the plate section 132 is provided with an aperture 137 adapted to fit over the rearwardly extending hub of the rake wheel bearing sleeve section 106. A hammer strap 138 is secured to the plate section 132 and is provided with a horizontally extending slot 139 that registers with a similar slot 141 formed in the body of the plate section 132. The rake wheel means of the windrow unit 130 includes a rake wheel 115 substantially identical with the other units described above and from Fig. 6, it will be seen that the plate section 132 is offset so as to dispose the plane of rotation of the windrow rake wheel 115 in a plane that lies rearwardly of the adjacent rake wheel 115 of the main rake wheel unit. The slots 139 and 141 are adapted to receive a clamping bolt 142 that extends through the vertical slot 101 in the right end of the bar or plate 91. The slot 139 and the slot 141 accommodate lateral movement of the windrow unit 130 as a whole when the right hand rake wheel unit of the main rake wheel means is adjusted, as for the purpose of keeping the associated drive chain tight, and then after such adjustment is made the bolt 142 is tightened to hold the windrow attachment 130 in operating position. The vertical position of the windrow rake wheel may be varied, as desired, by a stop bolt 144 that is disposed in the lower portion of the slot 101, the bolt 144 being adjustable in the slot 101 as desired. If the windrow unit is to be placed in an inoperative position, as for opening up a field or the like, the bolt 142 may be loosened and removed, and the windrow unit 130 swung upwardly about the right hand rake wheel bearing unit into a position, such as that shown in Fig. 7, and in order to retain the windrow unit in this position, the bolt 142 is re-inserted in the slots 139 and 141 and over the top edge of the right hand portion of the main frame or plate member 91, the contact of the bolt 142 with the upper edge of the plate member 91 serving to hold the rake wheel unit in its upper or inoperative position. When the windrow attachment 130 is employed, the shaft of the right hand rake wheel unit carries two sprockets 119a, one to receive the associated chain 121 and the other to receive a chain 121a that drives the windrow rake wheel unit. The lateral adjustment of the windrow rake wheel unit in the plate section 132 provides for maintaining the proper tension in the drive chain 121a.

To facilitate maintaining the windrow attachment in the proper position, the attachment includes a plate section 151 that has an aperture 153 receiving and adapting the plate section 151 to pass over the hub of the associated rake wheel bearing unit, the plate section 151 being apertured to receive the rear ends of the bolts 112 that secure the right hand bearing unit to the main plate section 91, there being spacers 152 to hold the plate 151 spaced from the plate 91 to accommodate the windrow attachment plate 132.

The windrow attachment 130 also includes a shield member 156 that is fixed to the windrow attachment frame member 131 by means of a bracket 157, the shield being curved outwardly and downwardly at its outer end and extended upwardly and inwardly, as at 158, at its inner ends so as to clear adjacent parts when the windrow attachment unit 130 is raised into an inoperative position. When the windrow attachment 130 is used, the shielding is completed by a flat shield member 159 that is fixed by brackets 160 and 161 to the auxiliary strap section 53 and to the adjacent finder lifting arm 84, but as shown in Fig. 8, when the windrow attachment 130 is not used, the flat shield 158 is replaced by a curved shield 162 and connected by brackets similar to brackets 160 and 161 to the auxiliary strap section 53 and the right hand finder wheel lifting arm 84, the shield 162 having a downwardly curved outer end. The several drive chains 121 and 121a and associated parts are protected by a suitable shield means generally conventional in construction and secured in any suitable way to the associated plate members.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a beet harvester, a top disposal unit comprising main supporting means disposable generally transversely of the harvester, said supporting means comprising a plate having a horizontally slotted opening adjacent each end and a vertically slotted opening in the generally central part, a bearing unit disposable in each opening, the bearing units in said end openings being adjustable horizontally along said plate and the bearing unit in said intermediate opening being adjustable vertically, means attaching said bearing units in selected positions of adjustment, and a plurality of rake wheels mounted on said bearing units.

2. The invention set forth in claim 1, further characterized by each of said bearing units including a cylindrical section extending through the associated opening in said plate and a flange portion, the latter and said plate being apertured to receive said attaching means and certain of the apertures in said plate and flanges being in the nature of slots to accommodate said horizontal and vertical adjustment of said bearing units.

3. In a beet harvester, a top disposal unit comprising main supporting means disposable generally transversely of the harvester, said supporting means comprising a first plate having a plurality of openings, a plurality of bearing units disposed in said openings, a rake wheel mounted on each bearing unit, an auxiliary rake wheel supporting plate, means pivotally mounting one end portion of said auxiliary supporting plate on one of said plurality of bearing units for generally vertical swinging movement relative to said first supporting plate, a rake wheel carried by said auxiliary supporting plate, and means fixing said auxiliary plate to said first plate in different positions of adjustment.

4. The invention set forth in claim 3, further characterized by said auxiliary plate fixing means comprising means providing a slot in said first plate, bolt means removably carried by said auxiliary plate and adapted to be disposed in said slot, and said bolt means being carried by said auxiliary plate so as to engage said first plate at a point spaced from said slot so as to hold said auxiliary plate in a raised position.

5. In a beet harvester, a top disposal unit comprising main supporting means disposable generally transversely of the harvester, said supporting means comprising a plate having a plurality of openings, a plurality of bearing units disposed in said openings, each bearing unit having a sleeve section extending through the associated opening in said supporting plate, a rake wheel mounted on each bearing unit, an auxiliary rake wheel supporting plate, means pivotally mounting one end portion of said auxiliary supporting plate on the sleeve section of one of said plurality of bearing units for generally vertical swinging movement relative to said first supporting plate, a rake wheel carried by said auxiliary supporting plate, and means fixing said auxiliary plate to said first plate in different positions of adjustment.

6. The invention set forth in claim 5, further characterized by each bearing unit including a flange and means connecting each flange to said supporting plate at one side thereof, an attaching plate having an aperture adapted to receive the sleeve section on which said auxiliary plate is pivotally mounted, and means including spacer means fixing said attaching plate to said first plate and disposing said attaching plate at the other side of said auxiliary plate to hold the latter on said bearing sleeve section.

7. In a beet harvester, a top disposal unit comprising main supporting means disposable generally transversely of the harvester, means connecting said supporting means with the tractor, comprising a pair of parallel links pivotally connected to each side of the harvester, a pair of vertical bars, each pivotally receiving the outer ends of said links, the lower end portions of said vertical bars being fixed to said supporting means, a transverse shaft rockably carried by the harvester and interconnecting certain of said links at opposite sides of the harvester so as to cause opposite ends of said supporting means to move together, and a plurality of top-engaging means carried by said transverse supporting means.

8. The invention set forth in claim 7, further characterized by adjustable means interconnecting said transverse shaft with certain of the links of one pair of said pairs of links so as to act through said links to adjust the height of one end of said supporting means relative to the other end thereof.

9. In a beet harvester, a top disposal unit comprising main supporting means disposable generally transversely of the harvester, a plurality of top-engaging wheels carried by said transverse supporting means, said supporting means being disposed at an angle to the longitudinal axis of the harvester, means connecting said supporting means with the tractor, comprising a pair of parallel upper and lower links pivotally connected to each side of the tractor, a pair of vertical bars, each pivotally receiving the outer ends of said links, a rockshaft fixed at one end to one of the lower links and extending substantially exactly at a right angle to said axis, and adjustable arm and link means connecting the other end of said rockshaft to the other of said lower links.

References Cited in the file of this patent

UNITED STATES PATENTS

| | | |
|---|---|---|
| 1,462,907 | Greening et al. | July 24, 1923 |
| 2,433,799 | Walz et al. | Dec. 30, 1947 |
| 2,657,519 | Hill | Nov. 3, 1953 |
| 2,680,343 | Enos | June 8, 1954 |
| 2,735,256 | West | Feb. 21, 1956 |
| 2,751,739 | Paul | June 26, 1956 |

FOREIGN PATENTS

| | | |
|---|---|---|
| 82,411 | Norway | Sept. 14, 1953 |